US008438140B2

(12) United States Patent
Polo-Malouvier et al.

(10) Patent No.: US 8,438,140 B2
(45) Date of Patent: May 7, 2013

(54) APPARATUS AND METHOD FOR GENERATING REPORTS FROM VERSIONED DATA

(75) Inventors: Ricardo Polo-Malouvier, Levallois-Perret (FR); Jean-Yves Cras, Paris (FR); Michael Emmett Thompson, Nogent-sur-Marne (FR); Charles Arthur Piercey, Palo Alto, CA (US)

(73) Assignee: Business Objects Software Ltd., Dublin (IE)

( * ) Notice: Subject to any disclaimer, the term of this patent is extended or adjusted under 35 U.S.C. 154(b) by 957 days.

(21) Appl. No.: 11/264,633

(22) Filed: Oct. 31, 2005

(65) Prior Publication Data

US 2006/0143243 A1    Jun. 29, 2006

Related U.S. Application Data

(60) Provisional application No. 60/639,020, filed on Dec. 23, 2004.

(51) Int. Cl.
*G06F 7/00*    (2006.01)
*G06F 17/30*   (2006.01)

(52) U.S. Cl.
USPC ............ 707/694; 707/695; 707/805; 707/806

(58) Field of Classification Search .................. 715/205; 707/638, 695, 694, 805, 806, 700, 802
See application file for complete search history.

(56) References Cited

U.S. PATENT DOCUMENTS

| 5,390,296 | A  | * | 2/1995 | Crandall et al. .............. 715/835 |
| 5,555,403 | A  |   | 9/1996 | Cambot et al. |
| 5,806,078 | A  | * | 9/1998 | Hug et al. ..................... 715/205 |
| 6,449,624 | B1 | * | 9/2002 | Hammack et al. ............ 707/203 |
| 6,766,315 | B1 | * | 7/2004 | Bratsos et al. .................... 707/3 |
| 2002/0059195 | A1 | | 5/2002 | Cras et al. |

* cited by examiner

*Primary Examiner* — Vincent Boccio
(74) *Attorney, Agent, or Firm* — Mintz, Levin, Cohn, Ferris, Glovsky and Popeo, P.C.

(57) ABSTRACT

A computer-readable medium includes a report generator configured to process a current version of a data set to generate a report including a data item. The computer-readable medium also includes a report data change tracker configured to identify a change in the data item with respect to a previous version of the data set. The computer-readable medium further includes a report data change presenter configured to superimpose an indication of the change onto the report.

12 Claims, 4 Drawing Sheets

APPARATUS AND METHOD FOR GENERATING REPORTS FROM VERSIONED DATA

CROSS-REFERENCE TO RELATED APPLICATION

This application claims the benefit of U.S. Provisional Application Ser. No. 60/639,020, filed on Dec. 23, 2004, the disclosure of which is incorporated herein by reference in its entirety.

BRIEF DESCRIPTION OF THE INVENTION

This invention relates generally to the generation of reports in a computer network. More particularly, this invention relates to a technique for generating reports from versioned data.

BACKGROUND OF THE INVENTION

The term report refers to structured content generated from data included in a data source, such as a database. In some instances, a report is generated in response to a set of queries associated with the report. Typically, a report-based query is designed to retrieve an appropriate subset of the data available in the data source, thus making it possible for a reporting tool to effectively establish the content to be displayed in a report. Since the data available in the data source may be updated, it is desirable to refresh a report-based query from time to time. Refreshing a report-based query typically involves repeated access to the data source to retrieve an updated subset of the data available in the data source, thus making it possible for the reporting tool to effectively update the content to be displayed in a report.

While this standard technique for updating a report is useful, it can present a notable disadvantage. In particular, this standard technique is often limited to displaying the report using data retrieved from a latest refresh of a report-based query. Thus, this standard technique often does not provide information as to how the content of the report has changed as a result of refreshing the report-based query. Also, this standard technique often does not allow the content of the report to be re-established based on data retrieved from a previous refresh of the report-based query.

In view of the foregoing, it would be highly desirable to provide an improved technique for analyzing and displaying a report so that changes in the report between successive refreshes of a report-based query can be readily appreciated. It would also be highly desirable to provide an improved technique for analyzing and displaying a report so that the report can be readily re-established based on data retrieved from a previous refresh of a report-based query.

SUMMARY OF THE INVENTION

One aspect of the invention relates to a computer-readable medium. In one embodiment, the computer-readable medium includes a report generator configured to process a current version of a data set to generate a report including a data item. The computer-readable medium also includes a report data change tracker configured to identify a change in the data item with respect to a previous version of the data set. The computer-readable medium further includes a report data change presenter configured to superimpose an indication of the change onto the report.

In another embodiment, the computer-readable medium includes executable instructions to retrieve multiple versions of a data set from a data source in accordance with successive refreshes of a query associated with a report. The computer-readable medium also includes executable instructions to assign a different version identifier to each of the multiple versions of the data set. The computer-readable medium also includes executable instructions to select a version of the data set from the multiple versions of the data set based on a version identifier assigned to that version of the data set. The computer-readable medium further includes executable instructions to generate the report based on that version of the data set.

Advantageously, embodiments of the invention provide a technique for versioning data retrieved from a data source and exploiting the versioned data for enhancing reporting capabilities. For example, the versioned data can be exploited for analyzing and displaying a report so that changes in the report between successive refreshes of a query can be readily appreciated. In such manner, a user can be alerted as to the changes in the report as well as to possible aberrations in the versioned data used to generate the report. As another example, the versioned data can be exploited for analyzing and displaying a report so that the report can be readily re-established based on a particular version of the versioned data.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE FIGURES

The invention is more fully appreciated in connection with the following detailed description taken in conjunction with the accompanying drawings, in which.

DETAILED DESCRIPTION

Figure 1:
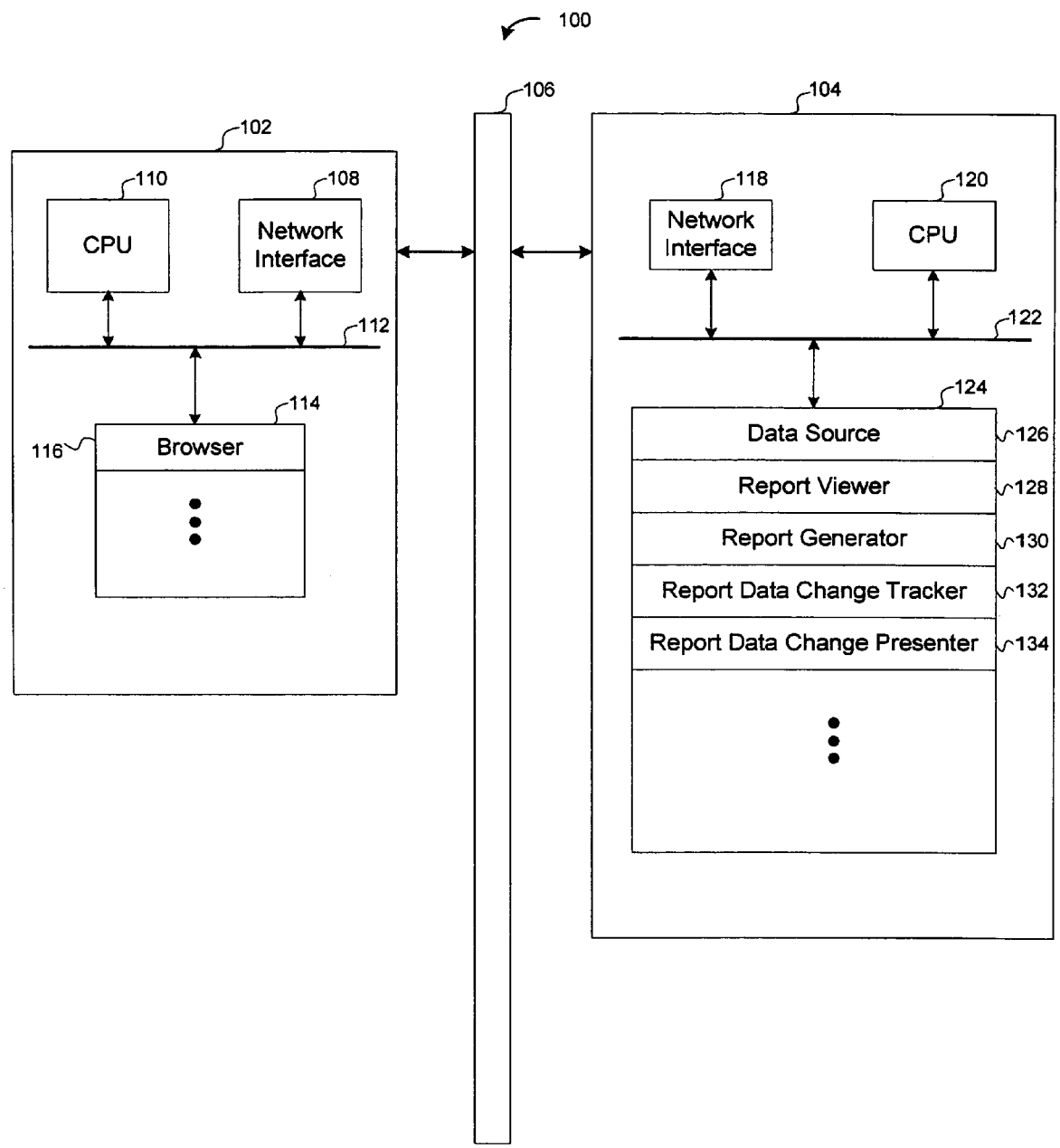
FIG. 1 illustrates a computer network implemented in accordance with an embodiment of the invention.

FIG. 1 illustrates a computer network 100 implemented in accordance with an embodiment of the invention. The computer network 100 includes at least one client computer 102 and at least one server computer 104. The client computer 102 and the server computer 104 are connected via a transmission channel 106, which can be any wired or wireless transmission channel.

The client computer 102 includes a number of standard components, including a network interface 108 and a Central Processing Unit ("CPU") 110, which are connected via a bus 112. The client computer 102 also includes a memory 114 that is connected to the bus 112. The memory 114 stores a set of executable programs, including a browser 116. The browser 116 operates to communicate with the server computer 104 and to display information received from the server computer 104.

The server computer 104 also includes a number of standard components, including a network interface 118 and a CPU 120, which are connected via a bus 122. The server computer 104 also includes a memory 124 that is connected to the bus 122. The memory 124 stores a data source 126, which can include, for example, a relational database, a multi-dimensional database such as an On-Line Analytical Processing ("OLAP") database, or a combination thereof. While the data source 126 is illustrated as residing in the server computer 104, it is contemplated that the data source 126 can reside in a separate computer (not illustrated) that is connected to the transmission channel 106.

The memory 124 also stores a set of executable programs, including a report viewer 128 and a report generator 130. The report viewer 128 operates as a standard user-interface to display a report, and the report generator 130 operates to generate the report from data included in the data source 126. In the illustrated embodiment, the report generator 130 generates the report based on a set of queries that are associated with the report. Typically, each query is designed to retrieve an appropriate data set from the data source 126, thus allowing the report generator 130 to effectively establish the content to be displayed in the report. Since the data available in the data source 126 may be updated, the report generator 130 typically refreshes each query from time to time, thus allowing the report generator 130 to effectively update the content to be displayed in the report.

Certain features of the report viewer 128 and the report generator 130 discussed up to this point are standard. However, the report viewer 128 and the report generator 130 are also configured to operate with a report data change tracker 132 and a report data change presenter 134.

In the illustrated embodiment, the report data change tracker 132 operates to provide versioning of data sets retrieved from the data source 126 in accordance with successive refreshes of the set of queries associated with the report. In turn, the versioned data sets can be exploited for analyzing and displaying the report. For example, the report data change tracker 132 can exploit the versioned data sets so as to identify changes in the report between successive refreshes of a query associated with the report. As another example, the report generator 130 can exploit the versioned data sets so as to re-establish the report based on a particular version of a data set, such as one retrieved in accordance with a particular refresh of a query associated with the report.

In the illustrated embodiment, the report data change presenter 134 operates in conjunction with the report viewer 128 to coordinate the display of the report. For example, once the report data change tracker 132 has identified changes in the report, the report data change presenter 134 can superimpose indications of the changes onto the report. As another example, the report data change presenter 134 can coordinate the display of the report that is re-established based on a particular version of a data set.

It should be recognized that the executable programs illustrated in the memory 124 are provided by way of example. The processing operations discussed with reference to the executable programs can be implemented in any of a number of ways. In addition, it should be recognized that the processing operations need not be implemented on the single server computer 104. In particular, it is contemplated that the processing operations can be implemented across a set of server computers, a set of client computers, a set of client computers and server computers, and so forth.

The foregoing provides a general overview of an embodiment of the invention. Attention next turns to FIG. 2, which illustrates processing operations associated with an embodiment of the invention.

Figure 2:
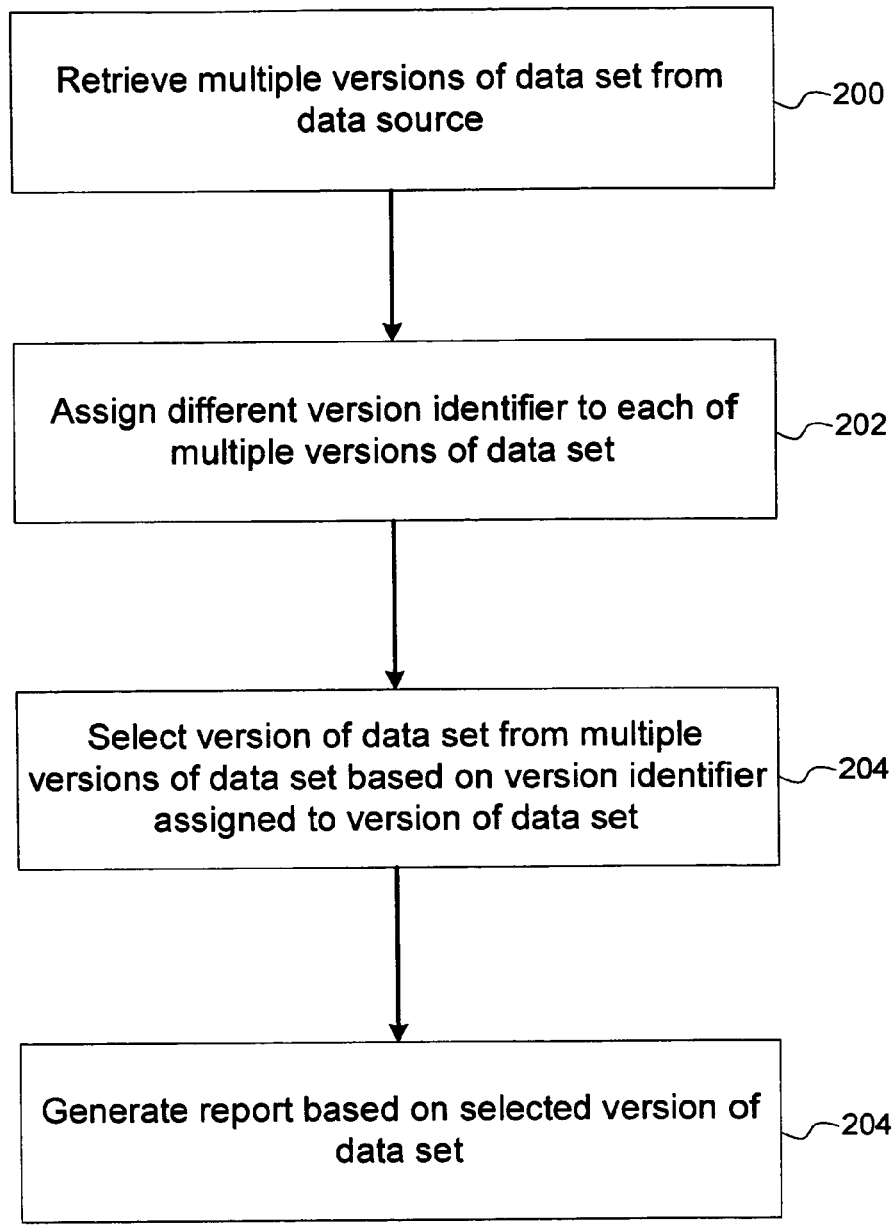
FIG. 2 illustrates processing operations associated with an embodiment of the invention.

The first processing operation illustrated in FIG. 2 is to retrieve multiple versions of a data set from a data source (e.g., the data source 126) (block 200). In the illustrated embodiment, a report generator (e.g., the report generator 130) retrieves the multiple versions of the data set in accordance with successive refreshes of a query associated with a report. Refreshing of the query can be performed in accordance with, for example, a specified event schedule (e.g., when a user requests a refresh or when the user opens the report) or a specified time schedule (e.g., periodically). It is contemplated that the report can be associated with additional queries, and certain processing operations discussed herein can be performed for each of the additional queries.

The report generator can store the multiple versions of the data set along with the report as a property of the report. However, it is also contemplated that the multiple versions of the data set can be stored separately from the report. As further discussed below, the report generator can arrange the multiple versions of the data set in accordance with a particular data model, such as a multi-dimensional data model in which data is organized along a number of dimensions or a relational data model in which data is organized using a set of tables including a number of fields.

The second processing operation illustrated in FIG. 2 is to assign a different version identifier to each of the multiple versions of the data set (block 202). In the illustrated embodiment, a report data change tracker (e.g., the report data change tracker 132) assigns different version identifiers to the multiple versions of the data set so as to allow the multiple versions of the data set to be distinguished from one another. In general, a version identifier can include any information that serves to distinguish a particular version of the data set from other versions of the data set. For example, a version identifier can indicate one or more of the following: a refresh date; a refresh time; and a version number.

The report data change tracker can store the different version identifiers along with the report as a property of the report. However, it is also contemplated that the different version identifiers can be stored separately from the report. As discussed above, the report generator can arrange the multiple versions of the data set in accordance with a particular data model, such as a multi-dimensional data model or a relational data model. In the case of a multi-dimensional data model, at least one dimension can be defined as a version dimension, and the report data change tracker can assign a different value along the version dimension to each of the multiple versions of the data set. Use of such a multi-dimensional model can be advantageous, since it allows efficient projection and slicing onto the version dimension with reduced memory consumption and calculation time. In the case of a relational data model, at least one field can be defined as a version field, and the report data change tracker can assign a different value of the version field to each of the multiple versions of the data set.

Table 1 through Table 4 illustrate the arrangement of three versions of a data set retrieved in accordance with successive refreshes of a query associated with a report, according to an embodiment of the invention. In the illustrated embodiment, the three versions of the data set represent revenues by year and by geographical location. As illustrated in Table 1 through Table 3, each version of the data set is retrieved from the data source as multiple rows of data, and these multiple rows of data are arranged using a set of tables including a number of fields, including a "Refresh Date-Time" field, a "Version" field, a "Year" field, a "Country" field, and a "Revenue" field. Table 4 illustrates a combined arrangement of the three versions of the data set. In the illustrated embodiment, the "Refresh Date-Time" field includes values that each indicate a refresh date and time of a particular row of data, while the "Version" field includes values that each indicate a version number of a particular row of data. The report data change tracker assigns different values of the "Refresh Date-Time" field and the "Version" field to the three versions of the data set. In such manner, the three versions of the data set can be distinguished from one another. To avoid double-counting different versions of the data set when performing a calculation, a "none" aggregation function can be implemented with respect to either, or both, of the "Refresh Date-Time" field and the "Version" field. In conjunction, a particular version of the data set can be set by default if no version of the data set is specified for the calculation.

TABLE 1

| First Refresh (First Version of Data Set) | | | Rows of Data | |
|---|---|---|---|---|
| Refresh Date-Time | Version | Year | Country | Revenue |
| 08/10/2004 12:00 | 1 | 2003 | US | 1000 |
| 08/10/2004 12:00 | 1 | 2003 | France | 500 |
| 08/10/2004 12:00 | 1 | 2003 | Poland | 100 |
| 08/10/2004 12:00 | 1 | 2004 | US | 1200 |
| 08/10/2004 12:00 | 1 | 2004 | France | 100 |
| 08/10/2004 12:00 | 1 | 2004 | Poland | 50 |
| 08/10/2004 12:00 | 1 | 2004 | Greece | 70 |
| 08/10/2004 12:00 | 1 | 2004 | UK | 120 |
| 08/10/2004 12:00 | 1 | 2005 | France | 200 |
| 08/10/2004 12:00 | 1 | 2005 | US | 1400 |

TABLE 2

| Second Refresh (Second Version of Data Set) | | | Rows of Data | |
|---|---|---|---|---|
| Refresh Date-Time | Version | Year | Country | Revenue |
| 09/10/2004 12:00 | 2 | 2004 | Italy | 50 |
| 09/10/2004 12:00 | 2 | 2004 | Spain | 50 |
| 09/10/2004 12:00 | 2 | 2004 | Germany | 200 |
| 09/10/2004 12:00 | 2 | 2004 | Greece | 90 |
| 09/10/2004 12:00 | 2 | 2004 | US | 1400 |
| 09/10/2004 12:00 | 2 | 2004 | France | 120 |
| 09/10/2004 12:00 | 2 | 2004 | Poland | 70 |
| 09/10/2004 12:00 | 2 | 2004 | UK | 120 |
| 09/10/2004 12:00 | 2 | 2005 | France | 200 |
| 09/10/2004 12:00 | 2 | 2005 | US | 1400 |

TABLE 3

| Third Refresh (Third Version of Data Set) | | | Rows of Data | |
|---|---|---|---|---|
| Refresh Date-Time | Version | Year | Country | Revenue |
| 10/10/2004 12:00 | 3 | 2002 | US | 200 |
| 10/10/2004 12:00 | 3 | 2003 | France | 600 |
| 10/10/2004 12:00 | 3 | 2003 | US | 1000 |
| 10/10/2004 12:00 | 3 | 2004 | Spain | 70 |
| 10/10/2004 12:00 | 3 | 2004 | France | 140 |
| 10/10/2004 12:00 | 3 | 2004 | US | 1200 |
| 10/10/2004 12:00 | 3 | 2004 | Italy | 50 |
| 10/10/2004 12:00 | 3 | 2004 | Greece | 90 |
| 10/10/2004 12:00 | 3 | 2004 | UK | 120 |
| 10/10/2004 12:00 | 3 | 2005 | France | 220 |

TABLE 4

| Combined Versions of Data Set | | Combined Rows of Data | | |
|---|---|---|---|---|
| Refresh Date-Time | Version | Year | Country | Revenue |
| 08/10/2004 12:00 | 1 | 2003 | US | 1000 |
| 08/10/2004 12:00 | 1 | 2003 | France | 500 |
| 08/10/2004 12:00 | 1 | 2003 | Poland | 100 |
| 08/10/2004 12:00 | 1 | 2004 | US | 1200 |
| 08/10/2004 12:00 | 1 | 2004 | France | 100 |
| 08/10/2004 12:00 | 1 | 2004 | Poland | 50 |
| 08/10/2004 12:00 | 1 | 2004 | Greece | 70 |
| 08/10/2004 12:00 | 1 | 2004 | UK | 120 |
| 08/10/2004 12:00 | 1 | 2005 | France | 200 |
| 08/10/2004 12:00 | 1 | 2005 | US | 1400 |
| 09/10/2004 12:00 | 2 | 2004 | Italy | 50 |
| 09/10/2004 12:00 | 2 | 2004 | Spain | 50 |
| 09/10/2004 12:00 | 2 | 2004 | Germany | 200 |
| 09/10/2004 12:00 | 2 | 2004 | Greece | 90 |
| 09/10/2004 12:00 | 2 | 2004 | US | 1400 |
| 09/10/2004 12:00 | 2 | 2004 | France | 120 |
| 09/10/2004 12:00 | 2 | 2004 | Poland | 70 |
| 09/10/2004 12:00 | 2 | 2004 | UK | 120 |
| 09/10/2004 12:00 | 2 | 2005 | France | 200 |
| 09/10/2004 12:00 | 2 | 2005 | US | 1400 |
| 10/10/2004 12:00 | 3 | 2002 | US | 200 |
| 10/10/2004 12:00 | 3 | 2003 | France | 600 |
| 10/10/2004 12:00 | 3 | 2003 | US | 1000 |
| 10/10/2004 12:00 | 3 | 2004 | Spain | 70 |
| 10/10/2004 12:00 | 3 | 2004 | France | 140 |
| 10/10/2004 12:00 | 3 | 2004 | US | 1200 |
| 10/10/2004 12:00 | 3 | 2004 | Italy | 50 |
| 10/10/2004 12:00 | 3 | 2004 | Greece | 90 |
| 10/10/2004 12:00 | 3 | 2004 | UK | 120 |
| 10/10/2004 12:00 | 3 | 2005 | France | 220 |

While Table 1 through Table 4 illustrate a relational data model, it should be recognized that the foregoing discussion can be extended to a multi-dimensional data model. For example, in the case of a multi-dimensional data model, the "Refresh Date-Time" field, the "Version" field, the "Year" field, and the "Country" field can correspond to different dimensions of the multi-dimensional data model, and the "Revenue" field can correspond to a measure of the multi-dimensional data model. Thus, in a similar manner as discussed above, a "Refresh Date-Time" dimension can include values that each indicate a refresh date and time of a particular row of data, while a "Version" dimension can include values that each indicate a version number of a particular row of data. The report data change tracker can assign different values along the "Refresh Date-Time" dimension and the "Version" dimension to the three versions of the data set. In such manner, the three versions of the data set can be distinguished from one another. To avoid double-counting different versions of the data set when performing a calculation, a "none" aggregation function can be implemented with respect to either, or both, of the "Refresh Date-Time" dimension and the "Version" dimension. In conjunction, as discussed previously, a particular version of the data set can be set by default if no version of the data set is specified for the calculation.

With reference to Table 1 through Table 4, certain rows of data are duplicated across two or more versions of the data set, and these duplicated rows of data are indicated in bold. Advantageously, these duplicated rows of data can be removed in accordance with an incremental data versioning feature as further discussed below.

Tables 5 and 6 illustrate the arrangement of three versions of a data set in accordance with an incremental data versioning feature, according to an embodiment of the invention. In the illustrated embodiment, multiple rows of data are arranged using a table including a number of fields, including a "Refresh Date-Time" field, a "Version" field, a "Year" field, a "Country" field, and a "Revenue" field. These fields are implemented in a similar fashion as previously discussed in connection with Table 1 through Table 4. With reference to Tables 5 and 6, three additional fields are included, namely a "Data 1" field, a "Data 2" field, and a "Data 3" field. These additional fields include comparison information with respect to a reference version of the data set. In particular, the "Data 1" field includes values that each indicate a result of comparing a particular row of data with rows of data of the first version of the data set, the "Data 2" field includes values that each indicate a result of comparing a particular row of data with rows of data of the second version of the data set, and the "Data 3" field includes values that each indicate a result of comparing a particular row of data with rows of data of the third version of the data set. A result of such comparing can be one of the following: "same" (e.g., if the same row of data exists in a reference version of the data set); "del" (e.g., if a particular row of data has been deleted in a reference version of the data set); "update" (e.g., if a particular row of data exists in a reference version of the data set but has one or more values changed); and "add" (e.g., if a particular row of data has been added in a reference version of the data set). In the illustrated embodiment, the report data change tracker performs such comparing and assigns values of the "Data 1" field, "Data 2" field, and the "Data 3" field to each row of data. In such manner, the report data change tracker can remove rows of data that are duplicated (e.g., having at least two values of "same") in a subsequent version of the data set. With reference to Table 5, these duplicated rows of data are indicated in bold.

TABLE 5

| Refresh Date-Time | Version | Year | Country | Revenue | Data 1 | Data 2 | Data 3 |
|---|---|---|---|---|---|---|---|
| 08/10/2004 12:00 | 1 | 2003 | US | 1000 | Same | Del | Same |
| 08/10/2004 12:00 | 1 | 2003 | France | 500 | Same | Del | Update |
| 08/10/2004 12:00 | 1 | 2003 | Poland | 100 | Same | Del | Del |
| 08/10/2004 12:00 | 1 | 2004 | US | 1200 | Same | Update | Same |
| 08/10/2004 12:00 | 1 | 2004 | France | 100 | Same | Update | Update |
| 08/10/2004 12:00 | 1 | 2004 | Poland | 50 | Same | Update | Del |
| 08/10/2004 12:00 | 1 | 2004 | Greece | 70 | Same | Update | Update |
| 08/10/2004 12:00 | 1 | 2004 | UK | 120 | Same | Same | Same |
| 08/10/2004 12:00 | 1 | 2005 | France | 200 | Same | Same | Update |
| 08/10/2004 12:00 | 1 | 2005 | US | 1400 | Same | Same | Del |
| 09/10/2004 12:00 | 2 | 2004 | Italy | 50 | Add | Same | Same |
| 09/10/2004 12:00 | 2 | 2004 | Spain | 50 | Add | Same | Update |
| 09/10/2004 12:00 | 2 | 2004 | Germany | 200 | Add | Same | Del |
| 09/10/2004 12:00 | 2 | 2004 | Greece | 90 | Update | Same | Same |
| 09/10/2004 12:00 | 2 | 2004 | US | 1400 | Update | Same | Update |
| 09/10/2004 12:00 | 2 | 2004 | France | 120 | Update | Same | Update |
| 09/10/2004 12:00 | 2 | 2004 | Poland | 70 | Update | Same | Del |
| 09/10/2004 12:00 | 2 | 2004 | UK | 120 | Same | Same | Same |
| 09/10/2004 12:00 | 2 | 2005 | France | 200 | Same | Same | Update |
| 09/10/2004 12:00 | 2 | 2005 | US | 1400 | Same | Same | Del |
| 10/10/2004 12:00 | 3 | 2002 | US | 200 | Add | Add | Same |
| 10/10/2004 12:00 | 3 | 2003 | France | 600 | Update | Add | Same |
| 10/10/2004 12:00 | 3 | 2003 | US | 1000 | Same | Add | Same |
| 10/10/2004 12:00 | 3 | 2004 | Spain | 70 | Add | Update | Same |
| 10/10/2004 12:00 | 3 | 2004 | France | 140 | Update | Update | Same |
| 10/10/2004 12:00 | 3 | 2004 | US | 1200 | Same | Update | Same |
| 10/10/2004 12:00 | 3 | 2004 | Italy | 50 | Add | Same | Same |
| 10/10/2004 12:00 | 3 | 2004 | Greece | 90 | Update | Same | Same |
| 10/10/2004 12:00 | 3 | 2004 | UK | 120 | Same | Same | Same |
| 10/10/2004 12:00 | 3 | 2005 | France | 220 | Update | Update | Same |

Table 6 illustrates the arrangement of the three versions of the data set in which the duplicated rows of data have been removed. The report data change tracker dynamically removes rows of data as each additional version of the data set is retrieved from the data source. As can be appreciated with reference to Table 6, removing the duplicated rows of data can serve to reduce memory consumption and calculation time. A further benefit of the comparison information included in Table 6 is that it allows different types of changes to a row of data to be distinguished from one another (e.g., "update" versus "del" or "add"). In some instances, different types of indications (e.g., different fonts or colors) can be used to distinguish different types of changes to a row of data.

TABLE 6

| Refresh Date-Time | Version | Year | Country | Revenue | Data 1 | Data 2 | Data 3 |
|---|---|---|---|---|---|---|---|
| 08/10/2004 12:00 | 1 | 2003 | France | 500 | Same | Del | Update |
| 08/10/2004 12:00 | 1 | 2003 | Poland | 100 | Same | Del | Del |
| 08/10/2004 12:00 | 1 | 2004 | France | 100 | Same | Update | Update |

TABLE 6-continued

| Refresh Date-Time | Version | Year | Country | Revenue | Data 1 | Data 2 | Data 3 |
|---|---|---|---|---|---|---|---|
| 08/10/2004 12:00 | 1 | 2004 | Poland | 50 | Same | Update | Del |
| 08/10/2004 12:00 | 1 | 2004 | Greece | 70 | Same | Update | Update |
| 09/10/2004 12:00 | 2 | 2004 | Spain | 50 | Add | Same | Update |
| 09/10/2004 12:00 | 2 | 2004 | Germany | 200 | Add | Same | Del |
| 09/10/2004 12:00 | 2 | 2004 | US | 1400 | Update | Same | Update |
| 09/10/2004 12:00 | 2 | 2004 | France | 120 | Update | Same | Update |
| 09/10/2004 12:00 | 2 | 2004 | Poland | 70 | Update | Same | Del |
| 09/10/2004 12:00 | 2 | 2005 | France | 200 | Same | Same | Update |
| 09/10/2004 12:00 | 2 | 2005 | US | 1400 | Same | Same | Del |
| 10/10/2004 12:00 | 3 | 2002 | US | 200 | Add | Add | Same |
| 10/10/2004 12:00 | 3 | 2003 | France | 600 | Update | Add | Same |
| 10/10/2004 12:00 | 3 | 2003 | US | 1000 | Same | Add | Same |
| 10/10/2004 12:00 | 3 | 2004 | Spain | 70 | Add | Update | Same |
| 10/10/2004 12:00 | 3 | 2004 | France | 140 | Update | Update | Same |
| 10/10/2004 12:00 | 3 | 2004 | US | 1200 | Same | Update | Same |
| 10/10/2004 12:00 | 3 | 2004 | Italy | 50 | Add | Same | Same |
| 10/10/2004 12:00 | 3 | 2004 | Greece | 90 | Update | Same | Same |
| 10/10/2004 12:00 | 3 | 2004 | UK | 120 | Same | Same | Same |
| 10/10/2004 12:00 | 3 | 2005 | France | 220 | Update | Update | Same |

While Tables 5 and 6 illustrate a relational data model, it should be recognized that the foregoing discussion can be extended to a multi-dimensional data model. For example, in the case of a multi-dimensional data model, the "Data 1" field, the "Data 2" field, the "Data 3" field can correspond to additional dimensions of the multi-dimensional data model. Thus, in a similar manner as discussed above, a "Data 1" dimension can include values that each indicate a result of comparing a particular row of data with rows of data of the first version of the data set, a "Data 2" dimension can include values that each indicate a result of comparing a particular row of data with rows of data of the second version of the data set, and a "Data 3" dimension can include values that each indicate a result of comparing a particular row of data with rows of data of the third version of the data set. Particularly in conjunction with the incremental versioning feature, use of such a multi-dimensional model can be advantageous, since it allows efficient projection and slicing onto the version dimension with reduced memory consumption and calculation time. In some instances, projection or slicing, which involves selection of a particular value along the version dimension, can be performed in a calculation time that is linear (e.g., in terms of the total number of distinct combinations of dimension values). In the case of a multi-dimensional data model, a further benefit of the comparison information included in Table 6 is that it allows different types of changes to a row of data to be distinguished from one another (e.g., "update," which corresponds to a change in a measure or attribute value versus "del" or "add", which corresponds to a deletion or an addition of a dimension value).

The third operation illustrated in FIG. 2 is to select a version of the data set from the multiple versions of the data set based on a version identifier assigned to that version of the data set (block 204). In the illustrated embodiment, a particular version of the data set can be set by default or can be specified by a user, and the report generator selects that version of the data set by performing a filtering operation using a version field or a version dimension. For example, that version of the data set can correspond to a current or latest version of the data set retrieved in accordance with a latest refresh of the query, and the report generator can select the current version of the data set based on a current version identifier.

With reference to Table 4, the report generator can select the first version of the data set by filtering the combined rows of data using the "Version" field and keeping rows of data including values indicating a first version number. Alternatively, or in conjunction, the report generator can select the first version of the data set by filtering the combined rows of data using the "Refresh Date-Time" field and keeping rows of data including values indicating a first refresh date and time. As another example, with reference to Table 6, the report generator can select the first version of the data set by filtering the combined rows of data using the "Data 1" field and keeping rows of data including values indicating "same." As a further example, with reference to Table 6, the report generator can select the second version of the data set by filtering the combined rows of data using the "Data 2" field and keeping rows of data including values indicating "same."

The fourth operation illustrated in FIG. 2 is to generate the report based on the selected version of the data set (block 206). In the illustrated embodiment, the report generator processes the selected version of the data set to generate the report including a data item. In some instances, the report generator can calculate a value of the data item based on the selected version of the data set, such as using a formula or an expression. For example, the selected version of the data set can correspond to a current version of the data set, and the report generator can calculate a current value of the data item. In such manner, the report can be established based on the current version of the data set. As another example, the selected version of the data set can correspond to any previous version of the data set, and the report generator can calculate a previous value of the data item. In such manner, the report can be re-established based on any previous version of the data set.

Once the report generator generates the report based on a particular version of the data set, the report data change tracker can identify a change in the report with respect to one or more different versions of the data set. For example, the report generator can generate the report based on the current version of the data set, and the report data change tracker can identify a change in the report with respect to any previous version of the data set. In particular, the report data change tracker can select a previous version of the data set based on a previous version identifier assigned to the previous version of the data set. The previous version of the data set can be set by default or can be specified by a user. As discussed previously, the report includes the data item, and the report data change tracker can identify a change in the data item with respect to the previous version of the data set. In particular, the report data change tracker can calculate a previous value of the data item based on the previous version of the data set, and the report data change tracker can then compare the previous value of the data item with the current value of the data item. Advantageously, the report data change tracker is configured to identify a change in the data item even if countervailing changes in the data item result in the previous value of the data item being the same as the current value of the data item. For example, such countervailing changes can result from differences in the underlying data used to calculate the data item, and the report data change tracker can identify such differences by comparing the previous version of the data set with the current version of the data set.

Once the report data change tracker identifies a change in the report, a report data change presenter (e.g., the report data change presenter 134) can superimpose an indication of the change onto the report. As discussed previously, the report includes the data item, and the report data change presenter can superimpose the indication of the change onto the data item. This indication can be provided using, for example, a particular font style, a particular font color, a particular background cell color, a particular shading, or a combination thereof. The particular format of this indication can be set by default or can be specified by a user. It is contemplated that other visualization paradigms can be used to provide an indication of a change.

For certain implementations, once the report generator generates the report based on a particular version of the data set, the report data change tracker can identify a trend in the report with respect to various versions of the data set. For example, the report generator can generate the report based on the current version of the data set, and the report data change tracker can identify a trend in the report with respect to a previous version of the data set and the current version of the data set. As discussed previously, the report includes the data item, and the report data change tracker can identify a trend in the data item with respect to the previous version of the data set and the current version of the data set. For example, the report data change tracker can identify an increasing trend or a decreasing trend in the data item.

Once the report data change tracker identifies a trend in the report, the report data change presenter can superimpose an indication of the trend onto the report. As discussed previously, the report includes the data item, and the report data change presenter can superimpose the indication of the trend onto the data item. This indication can be provided using, for example, a particular font style, a particular font color, a particular background cell color, a particular shading, a line chart, a bar chart, a map, a pie chart, a scatter plot, or a combination thereof. The particular format of this indication can be set by default or can be specified by a user. It is contemplated that other visualization paradigms can be used to provide an indication of a trend.

Advantages and features of some embodiments of the invention are more fully appreciated in connection with a more specific discussion. The following discussion provides examples of various scenarios that exploit versioned data and relies upon the following terms.

System: This term refers to a reporting tool, which can include a report data change tracker (e.g., the report data change tracker 132) and a report data change presenter (e.g., the report data change presenter 134). In some instances, the reporting tool can also include a report viewer (e.g., the report viewer 128) and a report generator (e.g., the report generator 130).

Report author: This term refers to a user of the reporting tool. Typically, a report author is a creator of a report.

Report consumer: This term refers to a user of the reporting tool. Typically, a report consumer is an intended audience of a report. In some instances, a report consumer and a report author can be the same person.

InfoView: This term refers to a user-interface provided by the reporting tool.

Figure 3:
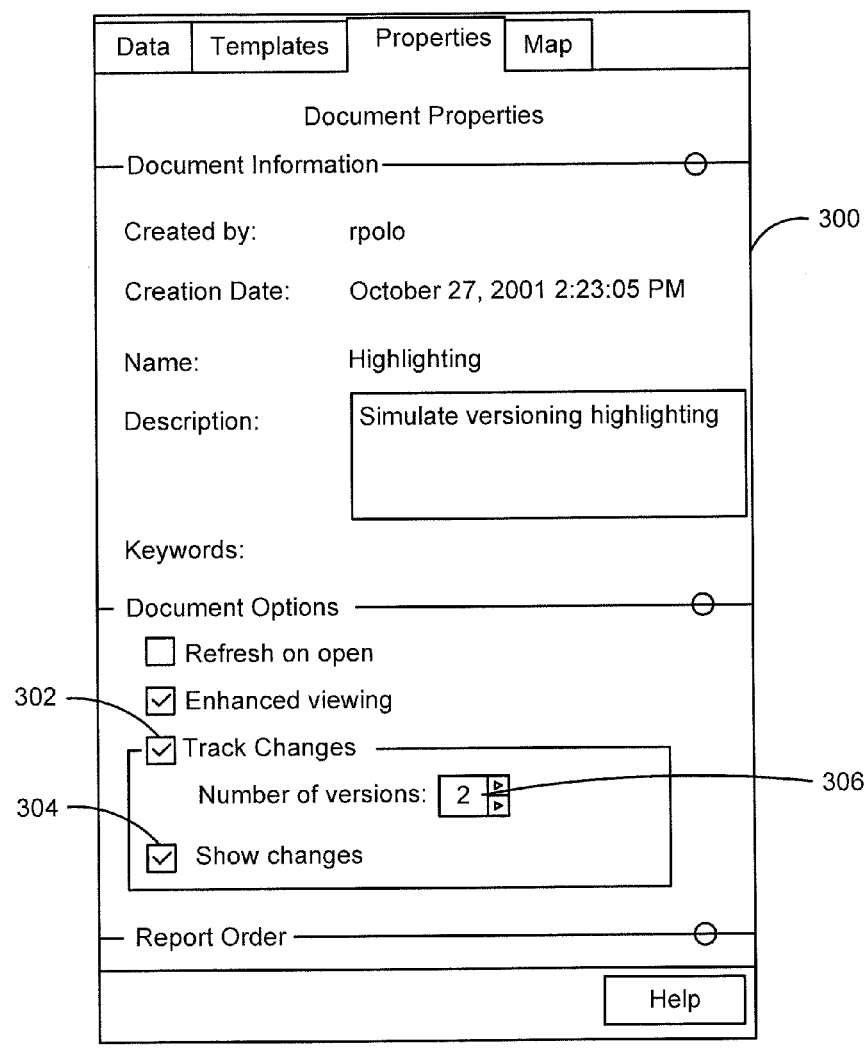
FIG. 3 illustrates an example of a Document Properties window to activate a report data change tracker and a report data change presenter, according to an embodiment of the invention.
Figure 4:
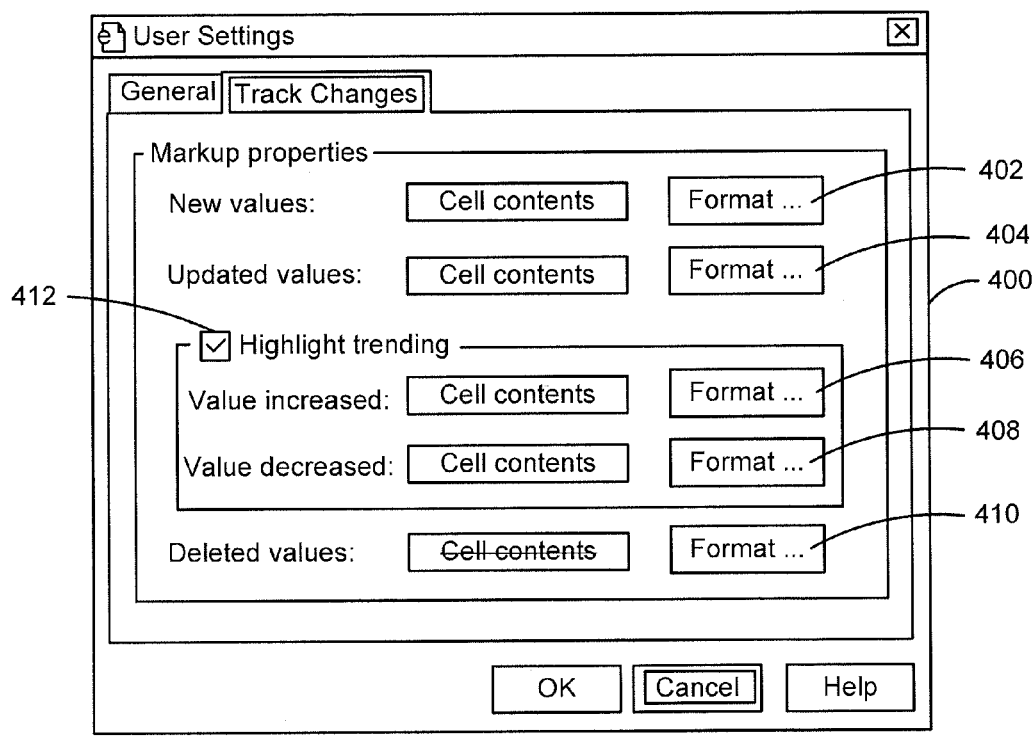
FIG. 4 illustrates an example of a User Settings window to specify different "Highlight" options and different "Trending" options, according to an embodiment of the invention.

I. Highlighting Report Data Changes:
  A. Setting Up "Track Changes" and "Show Changes" Options:
    Scenario: Highlighting report data changes between two versions of data.
    Summary: A report author sets up "Track changes" and "Show changes" options.
    Actors: The report author and the system.
    Pre-condition(s): A report already exists and includes one version of data from a previous refresh. The report does not have "Track changes" and "Show changes" options activated.
    Post-condition(s): The report is saved and has "Track changes" and "Show changes" options activated. Highlighting settings are defined as options (e.g., via "Highlight" option properties) and can be changed by report authors and report consumers.
    Operations:
      1. The report author logs into InfoView.
      2. The report author selects and edits a report named "Quarterly Report."
      3. The system displays a window with "Track changes" and "Show changes" options. FIG. 3 illustrates an example of a Document Properties window 300 to activate the report data change tracker (e.g., via a check box 302 to turn on "Track changes" option) and the report data change presenter (e.g., via a check box 304 to turn on "Show changes" option). The Document Properties window 300 also includes up/down arrows 306 to set the number of versions of data to be analyzed.
      4. The report author turns on "Track changes" option (e.g., by default).
      5. The report author turns on "Show changes" option (e.g., by default).
      6. The report author saves the report.
  B. Highlighting Report Data Changes After Refresh:
    Scenario: Highlighting report data changes between two versions of data.
    Summary: A report consumer exploits "Track changes" and "Show changes" options.
    Actors: The report consumer and the system.
    Pre-condition(s): A report already exists and includes one version of data from a previous refresh. The report has "Track changes" and "Show changes" options activated and has highlighting settings defined.
    Post-condition(s): The report is saved and includes two versions of data from the previous refresh and from latest refresh as requested by the report consumer.
    Operations:
      1. The report consumer logs into InfoView.
      2. The report consumer selects and views a report named "Quarterly Report."
      3. The system does not highlight any report data changes because there is one version of data stored in the report.
      4. The report consumer requests a refresh of data (e.g., via a button or "on open" if the report is "refresh on open").
      5. The system highlights report data changes based on "Highlight" options.
      6. The report consumer can change "Highlighting" options to specify which font styles or colors should be used to highlight report data changes. FIG. 4 illustrates a User Settings window 400 to specify different "Highlight"

options. In particular, the User Settings window 400 includes buttons 402, 404, and 410 to specify which font styles or colors should be used to highlight new or added values, updated values, and deleted values, respectively.

7. The report consumer saves the report.

C. Highlighting Report Data Changes Between Versions of Data:

Scenario: Highlighting report data changes between two versions of data.

Summary: A report consumer exploits "Track changes" and "Show changes" options.

Actors: The report consumer and the system.

Pre-condition(s): A report already exists and includes two versions of data from two refreshes. The report has "Track changes" and "Show changes" options activated and has highlighting settings defined.

Post-condition(s): None

Operations:
1. The report consumer logs into InfoView.
2. The report consumer selects and views a report named "Quarterly Report."
3. The system automatically highlights report data changes because the report has "Show changes" option activated and includes two versions of data from two refreshes. The system highlights the report data changes based on "Highlighting" options that were previously defined.
4. The report consumer closes the report.

II. Displaying Trend Data Based on Report Data Changes:

A. Setting Up "Trending" Options:

Scenario: Displaying trend data based on report data changes.

Summary: A report author sets up "Trending" options.

Actors: The report author and the system.

Pre-condition(s): A report already exists and includes two versions of data from two refreshes. The report has "Track changes" and "Show changes" options activated and has highlighting settings defined.

Post-condition(s): The report is saved and has "Trending" options activated.

Operations:
1. The report author logs into InfoView.
2. The report author selects and edits a report named "Quarterly Report."
3. The system displays a window with "Trending" options. Referring again to FIG. 4, the User Settings window 400 can be used to specify different "Trending" options. In particular, the User Settings window 400 can be used to activate the report data change presenter (e.g., via a check box 412 to turn on "Highlight trending" option). The User Settings window 400 also includes buttons 406 and 408 to specify which font styles or colors should be used to highlight increasing trends and decreasing trends, respectively.
4. The report author also turns on one or more additional "Trending" options (e.g., by default), such as:
   a. "Show last value" option;
   b. "Show percentage value increase or decrease" option (e.g., against value for previous version); and
   c. "Show values across versions" option.
5. The report author saves the report.

B. Displaying Trend Data in a Pop-Up Dialog:

Scenario: Displaying trend data based on report data changes.

Summary: A report consumer exploits "Trending" options.

Actors: The report consumer and the system.

Pre-condition(s): A report already exists and includes two versions of data from two refreshes. The report has "Track changes" and "Show changes" options activated and has highlighting settings defined. The report also has the following "Trending" options activated: "Show last value" and "Show percentage value increase or decrease" options.

Post-condition(s): None.

Operations:
1. The report consumer logs into InfoView.
2. The report consumer selects and views a report named "Quarterly Report."
3. The system automatically highlights report data changes because the report has "Show changes" option activated and includes two versions of data from two refreshes. The system highlights the report data changes based on "Highlighting" options that were previously defined.
4. The report consumer moves mouse pointer on top of a highlighted data item with value X.
5. The system pops-up a dialog showing the following trend data:
   a. Current value: X
      where X is a value displayed in the report. Here, X is calculated from a formula using a version of data from a latest refresh.
   b. Previous value: Y
      where Y is calculated from the formula using a version of data from a previous refresh.
   c. Trend: +/−Z %
      where Z % is a percentage change between X and Y (e.g., $Z=(X-Y)*(100/Y)$). Another possibility is to display Z % using fonts or colors defined for highlighting report data changes (e.g., Z % in blue for an increase, and Z % in red for a decrease).
6. The report consumer views the trend data.
7. The report consumer moves mouse pointer on top of a non-highlighted data item with value W.
8. The system pops-up a dialog showing the following trend data:
   a. Current value: W
   b. Previous value: W
   c. Trend: 0%
9. The report consumer views the trend data.
10. The report consumer closes the report.

C. Displaying Trend Data Using a Chart in a New Window:

Scenario: Displaying trend data based on report data changes.

Summary: A report consumer exploits "Trending" options.

Actors: The report consumer and the system.

Pre-condition(s): A report already exists and includes two versions of data from two refreshes. The report has "Track changes" and "Show changes" options activated and has highlighting settings defined. The report also has the following "Trending" option activated: "Show values across versions" option.

Post-condition(s): None.

Operations:
1. The report consumer logs into InfoView.
2. The report consumer selects and views a report named "Quarterly Report."
3. The system automatically highlights report data changes because the report has "Show changes" option activated and includes two versions of data from two refreshes. The system highlights the report data changes based on "Highlighting" options that were previously defined.
4. The report consumer moves mouse pointer on top of a highlighted data item with value X.

5. The system pops-up a dialog showing the following trend data:
   a. Current value: X
   b. Previous value: Y
   c. Trend: +/−Z %
6. The report consumer views the trend data.
7. The report consumer right-clicks on a cell including X.
8. The system displays a menu with "Show values across versions" option.
9. The report consumer selects "Show values across versions" option.
10. The system pops-up a window with a line chart that displays values of the highlighted data item for different versions of data.
11. The report consumer can select a chart type (e.g., from a predefined list of chart types).
12. The report consumer closes the window.
13. The report consumer closes the report.

III. Exploiting Data Versioning in Formulas and Other Report Elements:

To exploit versioned data for other reporting features of the system, the system can expose a version dimension or a version field to report authors and report consumers. For example, the system can expose a version dimension as a function of a formula language or as a document variable (e.g., named "Data Version"). In such manner, the version dimension can be visible to report authors and report consumers and can be used as any other function or document variable for formulas and other report elements. As another example, the system can expose a version field as a function of a formula language or as a report formula field (e.g., named "Data Version"). In such manner, the version field can be visible to report authors and report consumers and can be used as any other function or report formula field for formulas and other report elements.

IV. Resetting Data Versioning:

A. Automatically Resetting Data Versioning if a Query Definition Changes:

Scenario: Resetting data versioning if a query definition changes.

Summary: After a report author changes the query definition, data versioning is reset. In such manner, misleading data comparisons can be avoided if the query definition changes.

Actors: The report author and the system.

Pre-condition(s): A report already exists and includes two versions of data from two refreshes. The report has "Track changes" and "Show changes" options activated and has highlighting settings defined.

Post-condition(s): The report is saved and includes one version of data from latest refresh.

Operations:
1. The report author logs into InfoView.
2. The report author selects and views a report named "Quarterly Report."
3. The system automatically highlights report data changes because the report has "Show changes" option activated and includes two versions of data from two refreshes. The system highlights the report data changes based on "Highlighting" options that were previously defined.
4. The report author changes the query definition and refreshes a query associated with the query definition.
5. The system drops all previous versions of data. The system does not highlight any report data changes because there is one version of data remaining from latest refresh.
6. The report author saves the report.

B. Automatically Resetting Data Versioning if a Security Overload is Applied:

Scenario: Resetting data versioning if a security overload is applied that changes a query definition associated with a query.

Summary: After a report consumer refreshes the query using the security overload that is different from one used for a previous refresh, data versioning is reset. In such manner, misleading data comparisons can be avoided if the query definition changes.

Actors: The report consumer and the system.

Pre-condition(s): A report already exists and includes two versions of data from two refreshes. The report has "Track changes" and "Show changes" options activated and has highlighting settings defined.

Post-condition(s): The report is saved and includes one version of data from latest refresh.

Operations:
1. The report consumer logs into InfoView.
2. The report consumer selects and views a report named "Quarterly Report."
3. The system automatically highlights report data changes because the report has "Show changes" option activated and includes two versions of data from two refreshes. The system highlights the report data changes based on "Highlighting" options that were previously defined.
4. The report consumer requests a refresh of data.
5. The system retrieves the report consumer's security overload.
6. The system applies the security overload to the query.
7. The system checks if a query definition associated with the query has changed. If the query definition has changed, the system discards all previous versions of data.
8. The system applies the query and displays the report with a version of data from latest refresh. The system does not highlight any report data changes because there is one version of data remaining from latest refresh.
9. The report consumer saves the report.
10. The report consumer closes the report.

C. Data Versioning and View Time Security:

Scenario: Data versioning need not be reset if View Time security is applied. View Time security typically does not change a query definition associated with a query. Rather, View Time security applies filtering conditions on top of data responsive to the query.

Summary: After a report consumer refreshes the query using the View Time security that is different from one used for a previous refresh, data versioning is not reset. In such manner, security holes can be avoided if different View Time securities are applied.

Actors: The report consumer and the system.

Pre-condition(s): A report already exists and includes two versions of data from two refreshes. The report has "Track changes" and "Show changes" options activated and has highlighting settings defined.

Post-condition(s): The report is saved and includes three versions of data from two previous refreshes plus latest refresh.

Operations:
1. The report consumer logs into InfoView.
2. The report consumer selects and views a report named "Quarterly Report."
3. The system retrieves the report consumer's View Time security restrictions.
4. The system applies the View Time security restrictions to the report.

5. The system automatically highlights report data changes because the report has "Show changes" option activated and includes two versions of data from two previous refreshes. The system highlights the report data changes based on "Highlighting" options that were previously defined.

6. The report consumer requests a refresh of data.

7. The system checks if a query definition associated with a query has changed. If the query definition has not changed, the system retains all previous versions of data.

8. The system applies the query and the View Time security restrictions and displays the report with a version of data from latest refresh.

9. The system automatically highlights report data changes because the report has "Show changes" option activated and includes three versions of data from three refreshes. The system highlights the report data changes based on "Highlighting" options that were previously defined. The system highlights the report data changes between latest refresh and previous refresh.

10. The report consumer saves the report.

11. The report consumer closes the report.

V. Using Highlighted Report Data Changes to Analyze Report:

A. Analyzing Report Data Changes Between Versions of Data:

Scenario: Analyzing why report data has changed between two versions of data.

Summary: A report consumer exploits "Track changes" and "Show changes" options and uses drill-down navigation to find which underlying data has changed between the two versions of data.

Actors: The report consumer and the system.

Pre-condition(s): A report already exists and includes two versions of data from two refreshes. The report has "Track changes" and "Show changes" options activated and has highlighting settings defined.

Post-conditions: The report is saved with the report consumer's analysis showing which underlying data is responsible for a decrease of the report data.

Operations:

1. The report consumer logs into InfoView.

2. The report consumer selects and views a report named "Quarterly Report."

3. The system automatically highlights report data changes because the report has "Show changes" option activated and includes two versions of data from two refreshes. The system highlights the report data changes based on "Highlighting" options that were previously defined. The report includes a table including a cell with a value in red, which indicates that the value has decreased between the two versions.

4. The report consumer turns on "Drill" option so as to drill-down in the report to find which underlying data has changed.

5. The report consumer drills-down on related dimensions to find which underlying rows of data have changed (e.g., decreased) versus a previous version of data.

6. The report consumer saves the report.

7. The report consumer closes the report.

B. Finding Report Data Changes Between Versions of Data:

Scenario: Finding which report data has changed between two versions of data.

Summary: A report consumer exploits "Track changes" and "Show changes" options and uses "Next" and "Previous" navigation to find which report data has changed between the two versions of data.

Actors: The report consumer and the system.

Pre-condition(s): A report already exists and includes two versions of data from two refreshes. The report has "Track changes" and "Show changes" options activated and has highlighting settings defined.

Post-conditions: None.

Operations:

1. The report consumer logs into InfoView.

2. The report consumer selects and views a report named "Quarterly Report."

3. The system automatically highlights report data changes because the report has "Show changes" option activated and includes two versions of data from two refreshes. The system highlights the report data changes based on "Highlighting" options that were previously defined.

4. The report consumer selects "Next" option so as to view a next portion of the report where a value has changed or where an underlying row of data has been added.

5. The report consumer selects "Previous" option so as to view a previous portion of the report where a value has changed or where an underlying row of data has been added.

6. The report consumer closes the report.

An embodiment of the present invention relates to a computer storage product with a computer-readable medium having computer code or executable instructions thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-readable storage medium comprising executable instructions to:
   access a data source, in accordance with an initial refresh of a query associated with a report, to retrieve a first version of a data set from the data source to generate a first version of the report, the report comprising structured content generated from data included in the data source;
   establish content of the first version of the report based on the first version of the data set;
   access the data source, in accordance with a subsequent refresh of the query associated with the report, to retrieve a second updated version of the data set from the data source to generate a second version of the report;
   establish content of the second version of the report based on the second version of the data set;
   using a report data change tracker, identify any change in the value of a data item in the first version of the data set with respect to the value of the data item in the second version of the data set, even if countervailing changes in the value of the data item result in the value of the data item in the first version of the data set being the same as the value of the data item in the second version of the data set;
   superimpose an indication of any change in the value of the data item in the first version of the data set with respect to the value of the data item in the second version of the data set onto the content of the second version of the report.

2. The computer-readable storage medium of claim 1, wherein the executable instructions to identify any change in the value of a data item in the first version of the data set with respect to the value of the data item in the second version of the data set include executable instructions to identify changes when a first change in the content of the second version of the report is offset by a second change in the content of the second version of the report, such that the content of the second version of the report is the same as the content of the first version of the report.

3. The computer-readable storage medium of claim 1, wherein the executable instructions to superimpose an indication of any changes include executable instructions to provide an indication using at least one of a font style, font color, a cell color or shading.

4. A computer-readable storage medium comprising executable instructions to:
   perform a refresh of a report-based query to retrieve a current version of a data set from a data source;
   generate a report comprising structured content generated from the current version of the data set retrieved from the data source;
   select one or more previous versions of the data set from multiple previous versions of the data set that are associated with previous refreshes of the report-based query, the one or more selected previous versions of the data set being associated with previous content of the report;
   identify countervailing changes in the current content with respect to at least one of the one or more selected previous versions of the data set, even though the current content is the same as content of the report;
   superimpose an indication of countervailing changes onto the report in accordance with at least one of a font style, font color, a cell color or shading; and
   reset data versioning in the report upon a change in the query.

5. The computer-readable storage medium of claim 4, wherein the executable instructions to identify the countervailing changes include executable instructions to identify the countervailing changes when a first change in the current content is offset by a second change in the current content, such that the current content is the same as the previous content of the report.

6. A computer-readable storage medium comprising executable instructions to:
   perform a refresh of a report-based query to retrieve a current version of a data set from a data source, wherein the data source includes the current version of the data set and multiple previous versions of the data set;
   generate, based on the current version of the data set, a report including current content;
   select a previous version of the data set from the multiple previous versions of the data set, the selected previous version of the data set being associated with previous content of the report;
   identify offsetting changes in the current content based on a difference between the current version of the data set and the selected previous version of the data set, the offsetting changes including a first change in the current content and a second change in the current content that offsets the first change, such that the current content is the same as the previous content;
   superimpose an indication of the offsetting changes onto the report; and
   reset data versioning in the report upon a change in the query.

7. The computer-readable storage medium of claim 6, wherein said executable instructions to superimpose the indication of the offsetting changes include executable instructions to provide the indication of the offsetting changes in accordance with at least one of a font style, font color, cell color or shading.

8. The computer-readable storage medium of claim 6, further comprising executable instructions to establish the previous content of the report based on the selected previous version of the data set.

9. A method for identifying changes in a report, the method comprising:
   using a report generator, retrieving one or more versions of a data set from a data source in accordance with successive refreshes of a query associated with a report, the report comprising structured content generated from data included in the data source;
   using a report data change tracker, assigning a version identifier to each of the one or more versions of the data set retrieved from the data source;
   using the report generator, selecting at least one of the one or more versions of the data set based on the version identifier of the selected version of the data set;
   using the report generator, generating a report based on the selected version of the data set;
   using the report data change tracker, identifying one or more changes in the report generated based on the selected version of the data set with respect to at least one other of the one or more versions of the data set; and
   using a report data change presenter, superimposing an indication of the one or more changes onto the report generated based on the selected version of the data set.

10. The method of claim 9, wherein the version identifier can be indicated using one or more of a refresh date, a refresh time or a version number.

11. The method of claim 9, wherein the selecting involves performing a filtering operation using a version field or a version dimension.

12. The method of claim 9, wherein the report data change tracker identifies one or more trends in the report with respect to multiple versions of the one or more versions of the data set.

* * * * *